United States Patent [19]

Katumata et al.

[11] Patent Number: 4,811,720
[45] Date of Patent: Mar. 14, 1989

[54] FUEL SUPPLY SYSTEM FOR GASEOUS FUEL OPERATED VEHICLE AND REGULATOR THEREFOR

[75] Inventors: Shoji Katumata, Gotenba; Shunichi Kondo, Okazaki, both of Japan

[73] Assignees: Aisan Kogyo Kabushiki Kaisha, Toyota; Toyota Jidosha Kabushiki Kaisha, Ohbu, both of Japan

[21] Appl. No.: 941,103

[22] Filed: Dec. 12, 1986

[30] Foreign Application Priority Data

Dec. 16, 1985 [JP] Japan ................ 60-281035
Dec. 18, 1985 [JP] Japan ................ 60-283004
Jan. 23, 1986 [JP] Japan ................ 61-011072

[51] Int. Cl.$^4$ .................. F02B 43/00; F02G 5/00
[52] U.S. Cl. .................. 123/527; 60/320; 123/549; 123/557
[58] Field of Search .......... 123/527, 557, 549, 545, 123/553; 60/320

[56] References Cited

U.S. PATENT DOCUMENTS

| 2,815,013 | 12/1957 | McClain | 123/527 |
| 3,662,542 | 5/1972 | Streb | 60/320 |
| 3,789,820 | 2/1974 | Douglas et al. | |
| 4,492,208 | 1/1985 | Lent | 123/527 |
| 4,497,304 | 2/1985 | Wintrell | 123/527 |
| 4,571,481 | 2/1986 | Leary | 123/557 |
| 4,688,537 | 8/1987 | Calkins | 123/527 |

FOREIGN PATENT DOCUMENTS

59-165852 9/1984 Japan .

*Primary Examiner*—Douglas Hart
*Attorney, Agent, or Firm*—Cushman, Darby & Cushman

[57] ABSTRACT

A fuel supply system for a gaseous fuel operated vehicle engine in which a compressed gas from a bomb is decompressed by regulator means and then mixed with air to supply air-fuel mixture to the engine. The regulator means is divided into at least two units, locating an upstream regulator and the bomb in a luggage room section of a vehicle, and locating a downstream regulator and a mixer in an engine room section of the vehicle. A low pressure piping system is extended across a passenger's room section of the vehicle for interconnecting the upstream and downstream regulators. Particular structures of the regulator are also disclosed for effectively preventing freezing of fuel gas components which would lead to constriction of a high pressure gas passage formed in the regulator.

1 Claim, 7 Drawing Sheets

FUEL SUPPLY SYSTEM FOR GASEOUS FUEL OPERATED VEHICLE AND REGULATOR THEREFOR

BACKGROUND OF THE INVENTION

This invention relates to a fuel supply system for gaseous fuel operated vehicle engines, which is adapted to supply a compressed natural gas (CNG) to an engine after decompressing and mixing with air, and to a regulator suitable for use in the fuel supply system.

Recently, natural gases are re-evaluated as a substitute energy source for petroleum, and attempts are being made to use natural gases as a fuel for motor vehicles. The primary difference of the natural gase from petroleum resides in that the natural gas contains methane of low boiling point as a major component in contrast to the petroleum gas which is mainly constituted by propane and butane of relatively high boiling points. Accordingly a difficulty is encountered when using the natural gas as a fuel of motor vehicles because it is difficult to store it in liquefied form at normal temperature in the fashion of the liquefied petroleum gas (LPG) which is used as a fuel on certain kinds of motor vehicles. It is therefore the usual practice to store the natural gas in the form of compressed natural gas (CNG).

On a motor vehicle which uses CNG as a fuel, CNG which is normally contained in a bomb under high pressure, for example, under pressure of 200 kg/cm$^2$ is decompressed, for example, to the atmospheric pressure by a regulator and supplied to an engine after mixing it with air by a mixer which is constituted by known component parts including a venturi. Citing an example of actually commercialized cars, the CNG bomb is mounted in a luggage room section, namely, in the trunk room in case of a passenger car and on the loading platform in case of a truck, and the fuel gas is supplied from the bomb under high pressure to a regulator which is located in the engine room.

As the regulator is required to decompress the fuel gas to a great degree as mentioned hereinbefore, it is usually constituted by two or a larger number of integral or separate decompression stages. Anyway, the regulator is mounted in an engine room section of a vehicle, necessitating to extend a high pressure gas conduit to the engine room section from the bomb in the trunk across a passenger's room section. Needless to say, greater the length of the high pressure conduit, higher becomes the possibility of gas leakage from joint or other portions of the pipe.

There has also been known a regulator of the type which employs a diaphragm in association with a gas flow control valve, the diaphragm being responsive to the air pressure in a decompressing chamber to control the gas flows into the decompressing chamber from a high pressure gas passage led from a fuel gas bomb. This arrangement is used in two or a greater number of separate or integrally combined decompressing stages to depressurise the CNG from the bomb, for example, from 200 kg/cm$^2$ to the atmospheric pressure (Japanese Laid-open Patent Application No. 59-165852).

However, the pressure reduction by such an arrangement involves a problem that the terminal open end region of the high pressure gas conduit is cooled by adiabatic expansion of the fuel gas as it is released into the decompressing chamber from the high pressure conduit, freezing propane, butane, water or other gas components of relatively high melting point in that region, especially in the high pressure gas conduit, as a result narrowing the effective area of the conduit to block the fuel gas flow and lowering the performance quality of the engine.

In order to prevent water vapor in the gas from freezing due to adiabatic expansion of the gas during the sudden decompression, there has been proposed a regulator which is arranged to heat the circumference of the high pressure gas conduit by the use of cooling water which has been heated by the engine operation. However, in a case where the regulator is positioned in the vicinity of a fuel gas bomb in a luggage room section in the rear portion of a vehicle for reducing the length of the high pressure gas conduit to a minimal, the heating effect is lowered by heat dissipation from the cooling water conduit which has to be extended over a long distance between the engine room in the front portion of the vehicle and the luggage room in the rear portion.

SUMMARY OF THE INVENTION

It is therefore an object of the present invention to provide a fuel supply system for gaseous fuel operated vehicles, which has a shortened high pressure conduit for supply of a gaseous fuel.

It is another object of the invention to provide a regulator for a gaseous fuel operated engine, which is capable of preventing constriction or blocking of a high pressure gas conduit due to freezing of fuel gas components therein.

It is still another object of the invention to provide a regulator for a gaseous fuel operated engine, which can suitably prevent constriction of a high pressure gas conduit due to freezing of fuel gas components therein, even in a case where the regulator is located in the vicinity of a fuel gas bomb in a luggage room section remote from an engine room of a vehicle.

Figure 1:
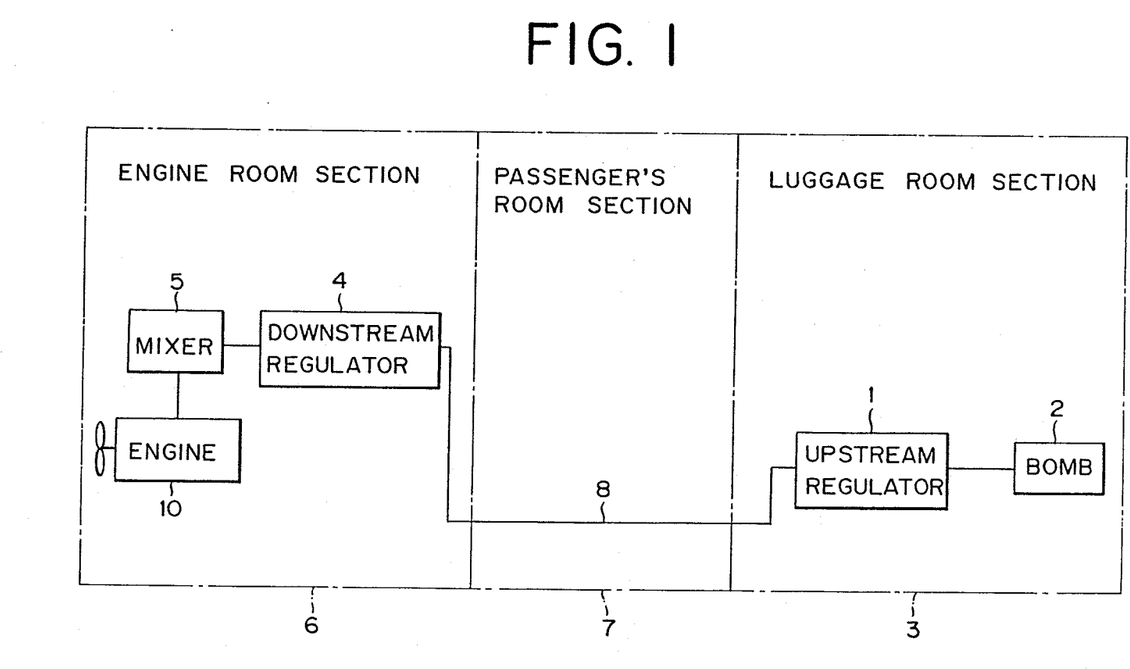
FIG. 1 is a block diagram showing the basic configuration of the invention.

In accordance with an aspect of the present invention, there is provided a fuel supply system for a gaseous fuel operated vehicle engine, in which a compressed gas from a bomb is decompressed and then mixed with air to supply an air-fuel mixture to the engine. As illustrated in FIG. 1, the regulator is divided into at least two units, locating an upstream regulator 1 and a fuel gas bomb 2 in a luggage room section 3 of a vehicle, locating a downstream regulator 4 and a mixer 5 in an engine room section 6, and interconnecting the upstream and downstream regulators 1 and 4 by a low pressure conduit 8 which is extended across a passenger's room section 7 of the vehicle.

The mixer 5 may be formed either integrally with or separately from the engine. In case the regulator is divided into two units, the upstream and downstream regulator units constitute primary and secondary regulators, respectively. Accordingly to the present invention, no limit is put on the number of the upstream or downstream regulator units in a case where regulator is divided into three or more units.

Figure 2:
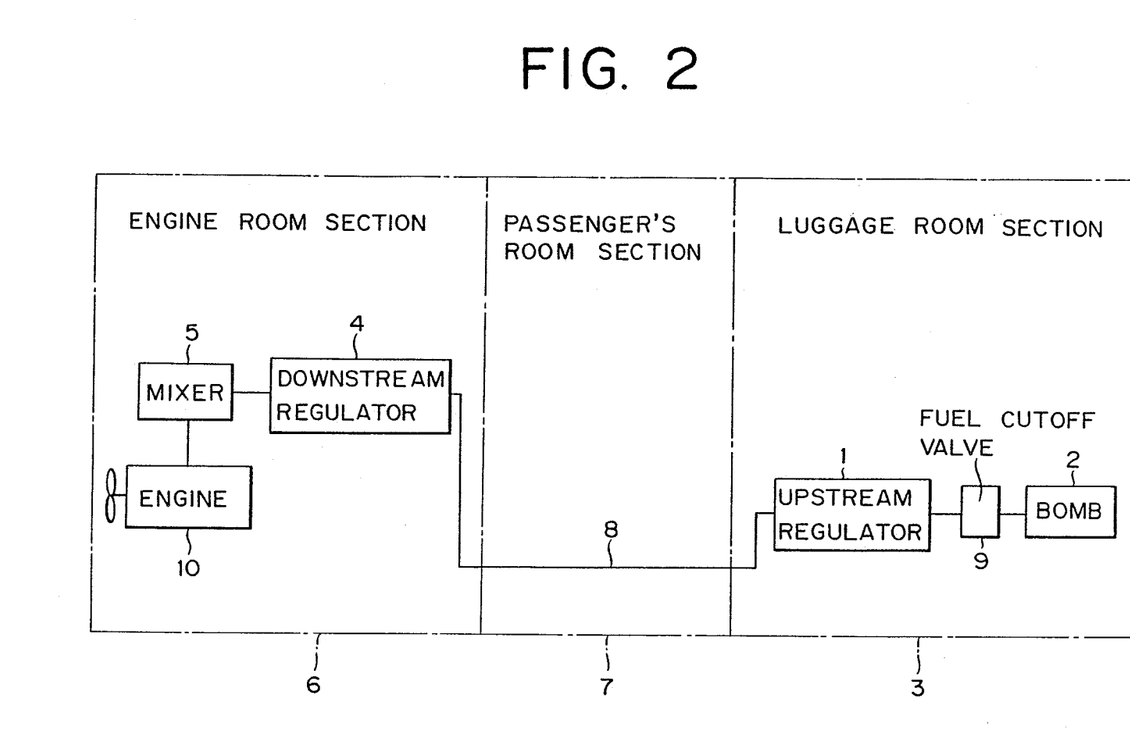
FIG. 2 is a block diagram showing the basic configuration of the invention in a practical form.

As shown in FIG. 2, a fuel cutoff valve 9 which is in association with an ignition switch is provided in the fuel gas conduit in a position immediately behind the fuel bomb 2, namely, in a position between the bomb 2 and the upstream regulator 1, thereby cutting off the supply of the high pressure fuel gas while the vehicle is at rest to minimize those portions which are constantly subject to high pressure.

The high pressure fuel gas which is supplied to the upstream regulator 1 from the bomb 2 is decompressed to several kg/cm$^2$, and then supplied to the downstream regulator 4 through a low pressure conduit 8. After further depressurizing the gas to the atmospheric pressure by the downstream regulator 4, it is mixed with air by the mixing device 5 and fed to the engine 10.

In this manner, the fuel gas flows through the low pressure conduit 8 after decompression by the upstream regulator 1, so that there is no necessity for extending a high pressure conduit which is required to endure a high pressure equivalent to the pressure in the bomb 2 as seen in the conventional arrangement. Consequently, it becomes possible to provide a safer fuel supply system at a lower cost. Besides, according to the present invention, the downstream regulator 4 is located in the engine room section of the vehicle, thereby preventing deteriorations in engine performance or starting failures due to delay of fuel which would occur in transient operating conditions in a case where the fuel is passed through a lengthy flow passage after the pressure reduction to the atmospheric pressure at the downstream regulator 4. Namely, the just-mentioned problems can be eliminated by shortening the fuel flow passage between the downstream regulator 4 and mixing device 5.

In accordance with another aspect of the present invention, there is provided a regulator for a gaseous fuel operated vehicle engine, in which the pressure of a fuel gas in a high pressure gas conduit is decompressed to a predetermined level by opening and closing the terminal open end of the conduit, which is in communication with a decompressing chamber, in response to the gas pressure prevailing in the decompressing chamber, the regulator essentially including a fuel cutoff valve provided in the high pressure gas conduit for cutting the fuel gas supply when the engine is not running or at the time of emergency, and a PTC heater located around the terminal open end of the high pressure gas conduit and having a resistance with a positive temperature coefficient.

The PTC heater is one of functional ceramics which are increasingly adopted for practical uses, and consists of a PTC (positive temperature coefficient) thermistor with an electric resistance which increases considerably with temperature increases.

Since the electric resistance of the PTC heater increases with elevation of its own temperature as mentioned above, it has a self-adjusting temperature control function, varying the current flowing through a heat generating portion when applied with a predetermined voltage during operation of an engine. Namely, it permits to supply a sufficient amount of heat to a required portion by an extremely simple electric circuit.

With the regulator for gaseous fuel operated engines according to the present invention, the fuel gas begins to flow upon starting an engine, and the temperature of the component parts around the terminal end of the high pressure gas conduit drops due to adiabatic expansion of the fuel gas. However, in this low temperature state, the PTC heater has a small resistance, permitting flow of relatively large current to heat up the component parts around the terminal end in an accelerated manner. As the temperature of the circumventive parts and the PTC heater itself are elevated, the resistance of the PTC heater is correspondingly increased until reaching a constant temperature where the amount of heat dissipation of the heater balances with the amount of electric consumption, thereby self-controlling the temperature to that constant level.

In this manner, the temperature drop is stopped in spite of the adiabatic expansion of the fuel gas, preventing freezing of fuel gas components which would lead to constriction of the high pressure gas conduit.

In accordance with still another aspect of the present invention, there is provided a regulator for gaseous fuel operated vehicle engines, in which the pressure of a fuel gas in a high pressure gas conduit is reduced by opening and closing a terminal open end of the high pressure gas conduit, which opens into a decompressing chamber, in response to the pressure prevailing in the pressure reducing chamber, the regulator including a fuel cutoff valve provided integrally in the high pressure gas conduit on the upstream side of the terminal open end thereof, and a heat pipe located between an exhaust system of the engine and the regulator having one end thereof connected to the exhaust system and the other end to a part in the vicinity of the terminal open end of the high pressure fuel gas conduit.

The heat pipe has an operating liquid sealed therein to transfer heat from a zone in contact with a high temperature portion to a zone in contact with a low temperature zone by evaporation and condensation of the operating liquid. The regulator for gaseous fuel operated engine according to the invention employs a heat pipe which has one end thereof connected to the exhaust system of an engine and the other end located around the terminal open end of a high pressure gas conduit, so that part of the thermal energy of the exhaust gas is supplied to relatively low temperature portions around the terminal open end of the conduit through the heat pipe, thereby heating the circumference of the terminal end to prevent freezing of fuel gas components in the high pressure gas conduit.

The above and other objects, features and advantages of the invention will become more apparent from the following description and the appended claims, taken in conjunction with the accompanying drawings.

BRIEF DESCRIPTION OF THE DRAWINGS

In the accompanying drawings.

DESCRIPTION OF THE PREFERRED EMBODIMENTS

Hereafter, the invention is described by way of preferred embodiments shown in the drawings, in which the component parts having correspondences in the basic configuration of FIG. 1 are designated by the same reference numerals.

Figure 3:
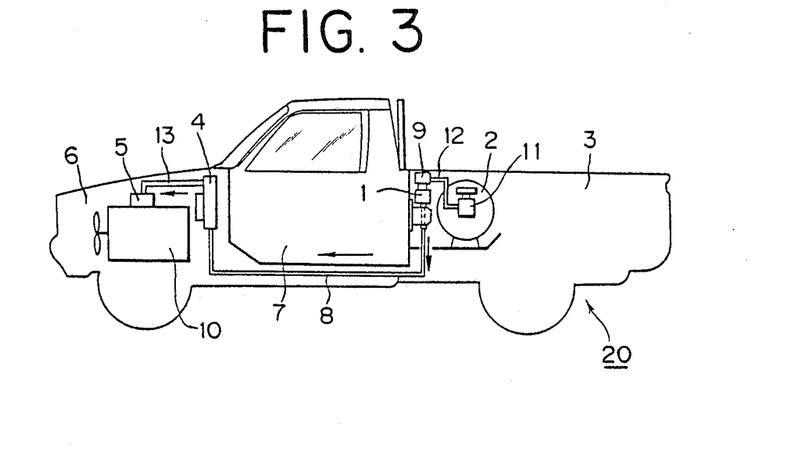
FIG. 3 is a schematic perspective view of a truck incorporating the present invention.

Referring to FIG. 3, there is illustrated an example of a truck incorporating the fuel supply for gaseous fuel operated vehicle according to the invention. As shown in this figure, the truck 20 can be divided into an engine room section 6 for accommodating an engine and associated parts, a driver's room section 7 with a seat, and a rear freight room section 3 with a loading platform. The fuel gas bomb 2 is formed, for example, from a metal and fixed in the freight room section 3 by the use of a belt and bolts. The bomb 2 is charged with a compressed fuel gas, for example, under pressure 150–200 kg/cm$^2$ in freshly charged state. This fuel gas is led out through a bomb valve 11 which is fixedly clamped to the bomb 2. Indicated at 12 is a high pressure conduit which connects the bomb valve 11 with a primary (upstream) regulator 1 which is fixed in the freight room section 3 in a manner similar to the bomb 2, and which pays sufficient considerations to safety since it is subjected to substantially the same pressure as the bomb 2.

The primary regulator 1 is a decompressing valve employing a diaphragm as will be described hereinlater, regulating the fuel gas substantially to a constant pressure level, for example, to a level of 5 to 6 kg/cm$^2$ when the bomb 2 is filled with more than a predetermined amount of fuel gas. Denoted at 9 is a fuel cutoff valve which is formed integrally with the primary regulator 1, and which is constituted, for example, by a high pressure electromagnetic valve and associated with an ignition switch or the like to cut off the supply of fuel gas when the vehicle is at rest or at the time of emergency.

On the other hand, accommodated in the engine room 6 is a secondary (downstream) regulator 4, an engine 10 and a mixer 5 which is attached to the engine. The secondary regulator 4 and mixer 5 are interconnected by a lo pressure hose 13 of rubber or similar material. Similarly to the primary regulator 1, the secondary regulator 4 consists of a decompressing valve with a diaphragm, for reducing the atmospheric pressure the fuel gas which is fed from the primary regulator 1 through a low pressure conduit 8 extended across the driver's cabin section 7, for example, in a lower portion of the vehicle body in that section. After decompression by the secondary regulator 4, the fuel gas is led into the aforementioned low pressure hose 13.

When the vehicle operates exclusively on CNG, the mixer 5 may be incorporated into the engine 10 in a manner similar to a carbureter of the gasoline engine. However, in a case where the vehicle uses gasoline in addition to CNG, it is desirable to mount the mixer 5 in the vicinity of a carbureter, not shown, or to form the mixer 5 integrally with a cabureter, sucking out the fuel gas from the downstream regulator 4 through the low pressure hose 13 in an amount corresponding to the amount of induction air by the vacuum which is generated by a component like a venturi nozzle. The low pressure hose 13 is desired to be as short as possible to cope with abrupt changes in the required amount of fuel.

In a case where the vehicle also operates on gasoline, the operation of the fuel cutoff valve, changeover of the fuel system, fuel supplying operation and resetting of the spark advance characteristics due to the change of fuel may be controlled by an electronic circuit such as a micro-processor or the like.

Figure 4:
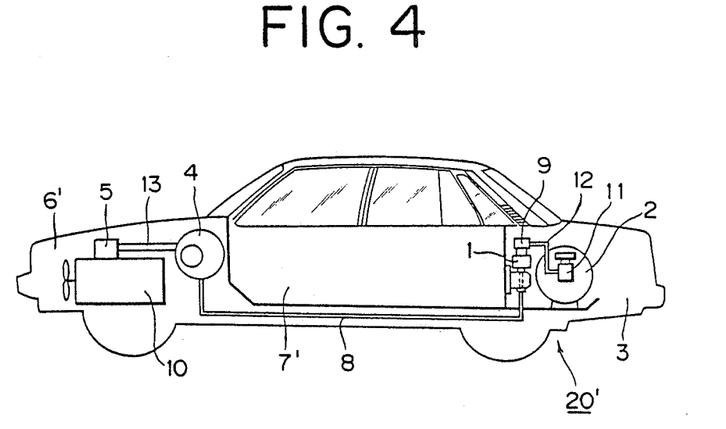
FIG. 4 is a schematic perspective view of a passenger car incorporating the present invention.

Referring to FIG. 4, there is illustrated an example of a passenger car incorporating the present invention, in which those parts common to the basic arrangement of FIG. 1 and the truck of FIG. 3 are designated by the same reference numerals. In this case, the passenger car 20' can be divided into an engine room section 6' accommodating an engine and associated parts, a passenger's room section 7' with seats, and a luggage room section 3' including a trunk room or the like. The arrangement, construction and operation of the fuel supply system of the invention are same as in the case of the truck 20 of FIG. 3, and therefore the description in these aspects is omitted here to avoid repetitions.

Figure 5:
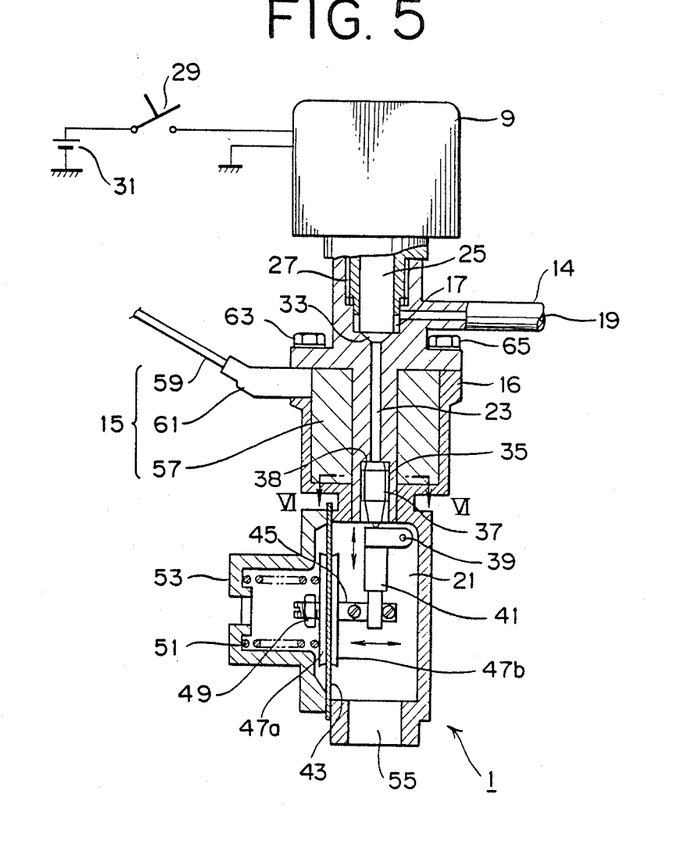
FIG. 5 is a partly sectioned view of a embodiment of the regulator for gaseous fuel operated engine, suitable for use with the fuel supply system according to the invention.

Referring to FIG. 5, there is shown in section an embodiment of the regulator which is suitable for use in the fuel supply system of the invention, particularly for use as the primary regulator of the system.

The primary regulator 1 includes a high pressure casing or housing 14 which is attached with a fuel cutoff valve 9, a low pressure casing or housing 16 which is assembled with decompressing parts, and a PTC heater 15 interposed between the two casings 14 and 16. The high pressure casing 14 interiorly defines a fuel cutoff chamber 17 which is in communication with a first high pressure gas passage 19 connected to a high pressure conduit from a bomb, not shown, and with a second high pressure gas passage 23 leading to a decompressing chamber 21 formed in the low pressure casing 16.

The fuel cutoff valve 9 is provided with a fuel cutoff needle valve 25 which is movable up and down in the fuel cutoff chamber 17, and an electromagnetic coil, not shown, for driving the needle valve 25, and fixed to the high pressure casing 14 by screws 27. The electromagnetic coil is connected to a battery 31 through a switch 29 which is operationally linked to an ignition switch, not shown, driving the needle valve 25 downward into abutting engagement with a conical wall 33 in a lower portion of the fuel cutoff chamber 17 to block the downward flow of the fuel, for example, when the engine is at rest. The switch 29 is not necessarily required to be a mechanical switch, and may be constituted by an electronic circuit with a switching function, for example, a function of turning on an off in response to a signal of an emergency sensor or the like.

Figure 6:
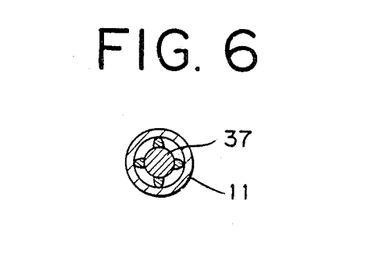
FIG. 6 is a sectional view taken on line VI—VI of FIG. 5.

Formed in a lower portion of the high pressure casing 14 is a valve chamber 35 in which a valve 37 is loosely fitted. The valve 37 has a non-circular shape in section with protuberances or recesses on its circumference as shown in FIG. 6, and operates to block the downward flow of the fuel when it is in intimate contact with a terminal open end 38 of the second high pressure passage 23, and to spout the fuel gas into the decompressing chamber 21 through the gap spaces formed between the protuberances or recesses of the valve 37 and the inner periphery of the valve chamber 35 when it is displaced downwardly away from the terminal open end 38 of the second high pressure passage 23. The lower end of the valve 37 is abutted against an L-shaped lever 41 which is pivotally supported on a pin 39 fixed in the low pressure casing 16. This L-shaped lever 41 is connected to a shaft 45 which transmits the displacement of a diaphragm 43 which defines the decompressing chamber 21 together with the low pressure casing 16. The shaft 45 is fixed by a nut 49 to shells 47a and 47b which grip the diaphragm 43. Designated at 51 is a spring member which is interposed between the outer shell 47a and a cover 53 which is fixed to the low pressure casing 16 through the diaphragm 43 and provided with a hole opening to the atmosphere. The spring constant of this spring member is determined depending upon the desired fuel gas pressure after the pressure reduction.

When the pressure in the reducing chamber 21 is low and the diaphragm 43 is displaced rightward in the drawing, the valve 37 is held in the lower position, permitting the fuel gas to flow into the decompressing chamber 21 through the second high pressure gas passage 23. As the air pressure in the decompressing chamber 21 gradually increases, the diaphragm 43 is displaced leftward, and the valve 37 closes the terminal open end 38 of the second high pressure passage 23 to block the flow of fuel gas. In this manner, the air pressure in the decompressing chamber 21 is constantly maintained at a level corresponding to the spring force of the spring member 51 at a stationary position of the diaphragm 43, discharging the fuel gas into the low pressure gas passage 55 under that pressure.

On the other hand, the fuel gas undergoes adiabatic expansion as it is released into the decompressing chamber 21, so that the parts neighboring the terminal open end 38 of the second high pressure passage 23 and the valve chamber 35 are cooled to a considerable degree. Therefore, in present embodiment, a PTC heater 15 is provided around the circumference of the second high pressure passage 23 and the valve chamber 35. The PTC heater 15 which is fixedly mounted on the low pressure casing 16 by bolts 63 and 65 includes a heating element 57 consisting of a PTC thermistor of $BaTiO_3$ type, wires 59 connected to the opposite ends of the heating element 57 to apply a predetermined voltage thereto, and a waterproof cover 61. The voltage application to the heating element 57 may be effected without a special control, for example, linked with the ignition to effect constantly when the engine is in operation. Although the temperature in the neighborhood of the terminal open end 38 drops immediately after starting the engine, the neighboring parts are heated up almost instantly by the large current flowing through the heating element 57 which initially has a small resistance. Once heated up, the resistance of the heating element 57 increases extremely, maintaining the neiborhood of the second high pressure passage 23 and valve chamber 35 at a predetermined normal temperature without a large electric power consumption.

Though the PTC heater 15 is located only around the second high pressure gas passage 23 and valve chamber 35 in this particular embodiment, it should be understood that the present invention covers various modifications or alterations which can be made in this regard, for example, location of the heater in other positions or extension of the heater onto the circumference of the decompressing chamber 21.

Figure 7:
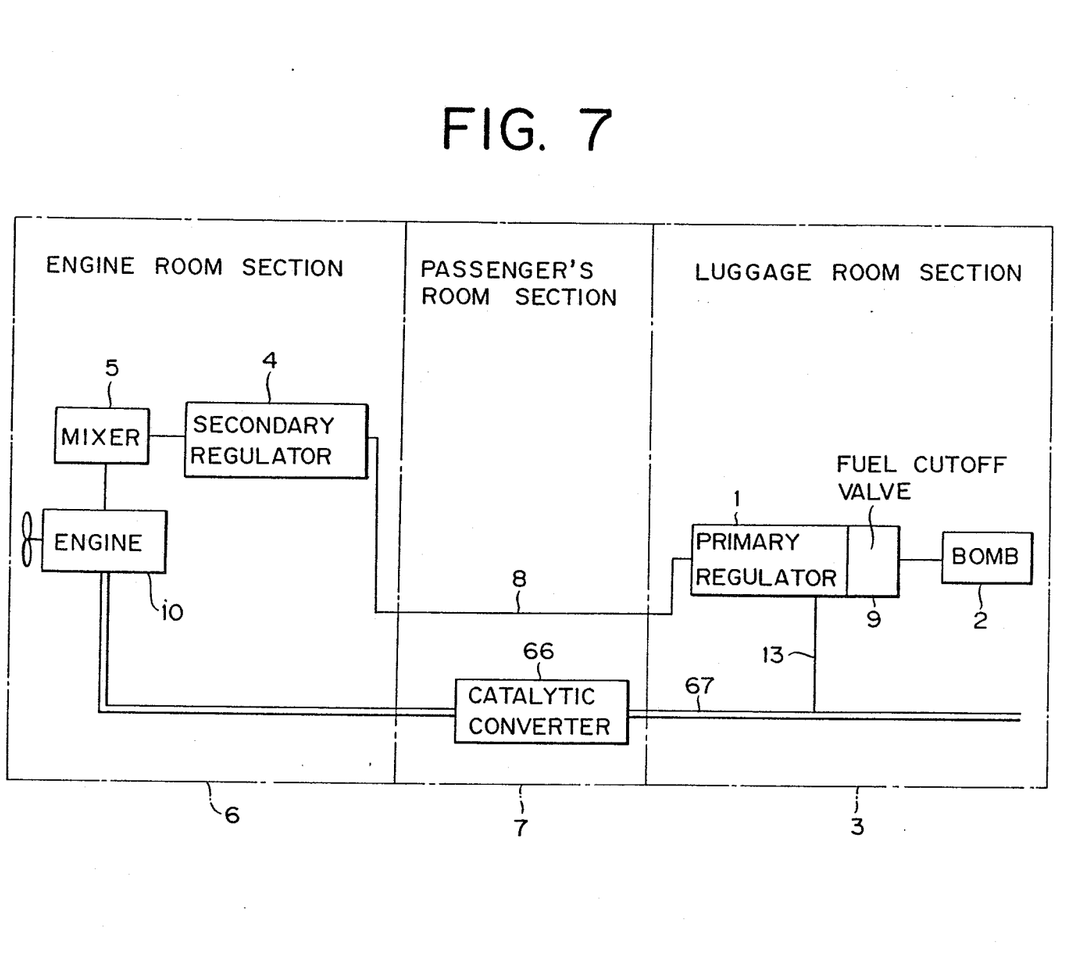
FIG. 7 is a block diagram of a vehicle mounting a regulator with a heat pipe.

Referring now to FIG. 7, there is schematically shown another embodiment of the fuel supply system for gaseous fuel operated vehicle, employing a regulator with a heat pipe. In this case, the regulator is divided into two or more units to shorten the length of the high pressure gas conduit. If it is divided into two units, for example, a primary regulator 1 which is formed integrally with a fuel cutoff valve 9 and a CNG charged bomb 2 are located in a luggage room section in the rear portion of a vehicle (a trunk room of a passenger car or a loading platform of a truck), locating a secondary regulator 4 in an engine room section 6 in a front portion of the vehicle along with a mixer 5 and an engine 10. The primary and secondary regulators 1 and 4 are interconnected by a conduit 8 which is laid across a passenger's room section 7 of the vehicle.

Figure 8:
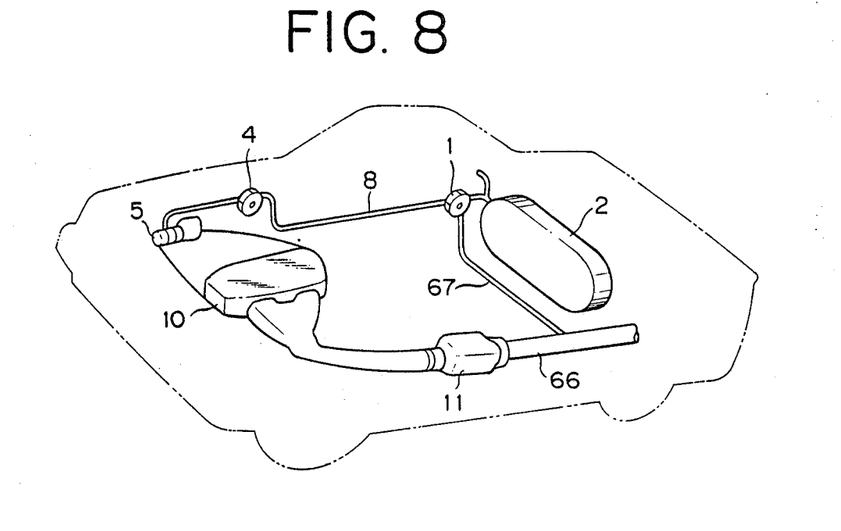
FIG. 8 is a schematic perspective view of a vehicle mounting a regulator with a heat pipe.

The fuel gas such as CNG which is charged in the fuel bomb 2 under pressure of 150–200 $kg/cm^2$ in a fresh state is fed to the primary regulator 1 through the fuel cutoff valve 9 to reduce the gas pressure, for example, to 3–5 $kg/cm^2$, and then fed to the secondary regulator 4 through the conduit 8. The fuel gas which has undergone the primary pressure reduction is further decompressed by the secondary regulator 4 substantially to the level of the atmospheric pressure, for example, to a level of 0 to 200 mmAq, and supplied to the engine 10 after mixing same with air in a predetermined ratio by the mixer 5 which is formed integrally with or separately from the engine 10. The exhaust gas resulting from combustion of the air-fuel mixture in the engine 10 is cleaned by a catalytic converter 66 before releasing into the atmosphere through an exhaust pipe 67. Illustrated in FIG. 8 is the positional relationship of the various component parts of a vehicle as shown in FIG. 7, a truck in this case. Like component parts are designated by like reference numerals, and their description is omitted here to aboid repetitions.

Figure 9:
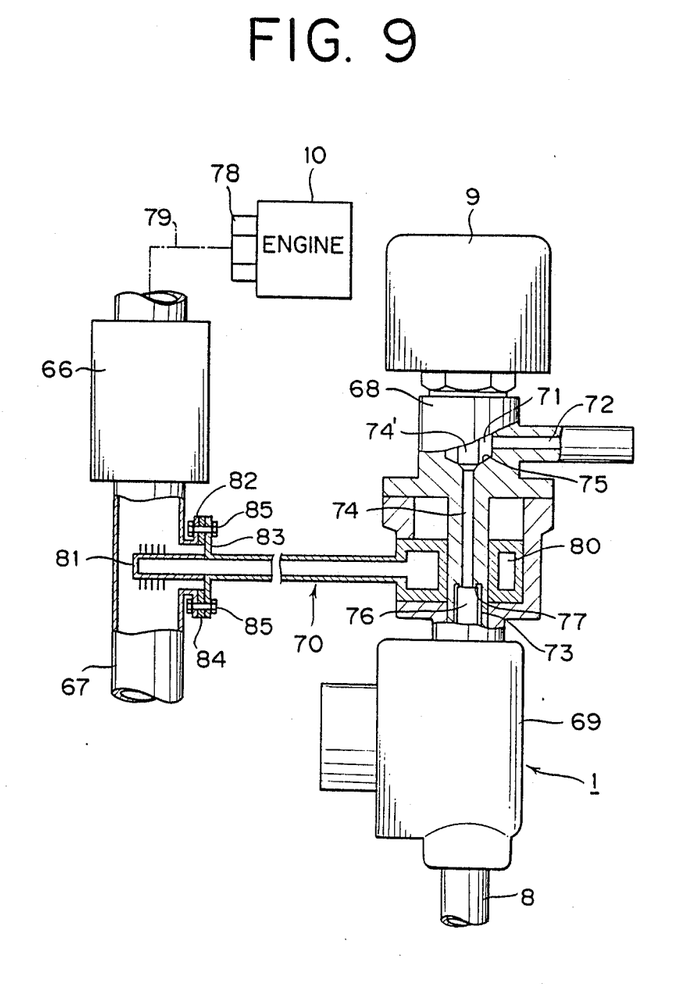
FIG. 9 is a partly sectioned view of another embodiment of the regulator for gaseous fuel operated engine, suitable for use with the fuel supply system according to the invention.

In this embodiment, the primary regulator 1 is constituted, as shown particularly in FIG. 9, by a high pressure casing 68 which is attached with the fuel cutoff valve 9, a low pressure casing 69 which is provided with various parts for pressure reduction, and a heat pipe 70 which is interposed between the two casings and has its one end extended into the exhaust pipe 67. The high pressure casing 68 interiorly defines a fuel cutoff chamber 71 which is in communication with a first high pressure gas passage 72 connected to a high pressure conduit from the fuel bomb, not shown, and with a second high pressure gas passage 74 communicating through the valve chamber 73 with a pressure reducing chamber (not shown) which is formed in the low pressure casing 69.

The fuel cutoff valve 9 includes a needle valve 74' which is movable up and down in the fuel cutoff chamber 71, and an electromagnetic coil, not shown, for driving the needle valve 74', the cutoff valve 9 being integrally attached to the high pressure casing 68 by fastening means or the like. By making or braking the connection of the electromagnetic coil with a battery, not shown, the needle valve 74' is driven downward in the drawing to abut against a conical wall 75 in a lower portion of the fuel cutoff chamber 71 to block the downward flow of the fuel when the engine is at rest or at the time of emergency.

The low pressure casing 69 is of a known construction using a diaphragm, not shown, and arranged to move up and down a valve 76, which is loosely fitted in the valve chamber 73, according to displacement of the diaphragm thereby opening or closing a clearance between the valve 76 and an annular projection 77 (corresponding to the terminal open end) which is formed on the high pressure casing 68 around the circumference of the opening of the second high pressure gas passage 74 to control the fuel gas flow from the second high pressure gas passage 74 to a decompressing chamber which is formed in the low pressure casing 69 though not shown, while reducing the fuel gas pressure to a predetermined level.

On the other hand, the exhaust manifold 78 of the engine 10 is connected to a catalytic converter 66 through an upstream exhaust pipe 79, and an exhaust pip 67 is connected to the catalytic converter 66. The exhaust gas which is discharged from the respective cylinders of the engine 10 and led to the upstream exhaust pipe 79 through the exhaust manifold 78 is cleaned through the catalytic converter 66 and passed in hot state through the exhaust pipe 67 before release into the atmosphere.

The heat pipe 70 has its one end so arranged as to wrappingly contact the high pressure casing 68 around the circumference of the second high pressure gas passage 74, forming an annular cavity 80 in concentric relation with the second high pressure gas gassage 74. The other end 81 of the heat pipe 70 is protruded into the exhaust pipe 67 through a flange 82 which is formed on the exhaust pip 67. The heat pipe 70 is fixed to the flange 82 by way of a disk-like projection 83 which is formed around the heat pipe 70 and fastened to the flange 82 by a plural number of bolts and nuts 85 through a heat resistant shock absorbing material 84 like rubber of the like.

Figure 10:
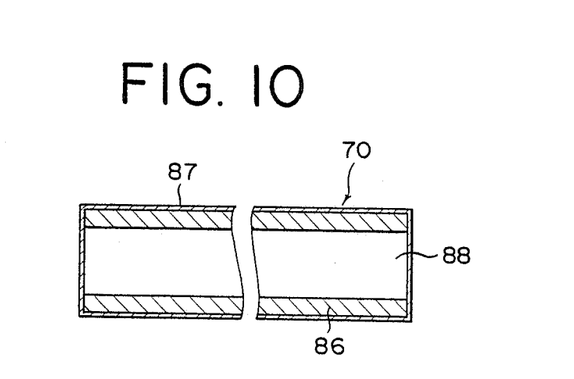
FIG. 10 is a sectional view of a heat pipe.

As seen in FIG. 10 which shows the basic construction, the heat pipe 70 is constituted by a pipe 87 having a wick structure with high capillarity adhered on the inner periphery thereof, and an operating liquid which is sealed in the pipe after evacuation such that the wick is filled with the liquid to a sufficient degree. Accordingly, when one end of the heat pipe is heated while cooling the other end, the operating liquid in a heated zone is evaporated by depriving the heat of vaporization, and the operating liquid in a cold zone condenses by giving up the heat of condensation. As a result, there occurs a pressure difference between the vapor phases in the heated and cooled zones, causing the vapors to flow from the heated zone to the cooled zone through the passage 88 in the pipe 87. On the other hand, the liquid surface in the heated zone sinks into the wick 86 by evaporation of the operating liquid, increasing the capillary pressure, while the capillary pressure in the cooled zone drops due to condensation of the vapors. Consequently, by the difference in capillary pressure between the heated and cooled zones, the operating liquid in the cooled zone is caused to flow toward the heated zone through the wick. In this manner, the vapors resulting from evaporation in the heated zone are condensed in the cooled zone and returned to the heated zone, and the same cycle is repeated. Thus, heat is transferred to the cooled zone by vapors, mainly in the form of latent heat resulting from phase changes by evaporation and condensation, dissipating the heat of condensation to the outside from the cooled zone. Normally, the amount of heat transfer by a heat pipe is about several hundred times that of copper.

In this embodiment, the aforementioned heated zone corresponds to the heat pipe portion which is disposed in the exhaust pipe 67, and the cooled zone corresponds to the circumference of the second high pressure gas passage 74 of the primary regulator 1 and the valve chamber 73. Accordingly, the heat of the exhaust gas which passes through the exhaust pipe 67 is tranferred to the regulator 1 adequately through the heat pipe 70, suppressing the cooling efect of the adiabatic expansion of the fuel gas from the second high pressure gas passage 74 to prevent freezing of fuel gas components.

Although the heat pipe 70 is located only around the circumferences of the second high pressure gas passage 74 and valve chamber 73 in this particular embodiment, it is possible to locate the heat pipe in other positions without departing from the technical sphere of the invention, for example, to extend the heat pipe as far as the circumferences of the fuel cutoff chamber 71 and the decompression chamber in the low pressure casing 69. The other end of the heat pipe 70 which is protruded into the exhaust pipe 67 downstream of the catalytic converter 66 may be instead protruded into the upstream exhaust pipe 79 or the catalytic converter 66 if desired.

It will be appreciated from the foregoing description that, according to the present invention, the fuel gas which flows through the conduit laid in the passenger's room section has already been decompressed to a substantial degree by the upstream regulator, almost completely precluding the possibility of leakage of fuel gas from the conduit. In addition, since the upstream regulator is located in the vicinity of the fuel gas bomb in the luggage room section, the length of the high pressure gas conduit can be shortened to an extent which is desirable for the sake of safety. Namely, should a leak of the high pressure fuel occur, it takes place in the luggage room section of the vehicle and the leaked gas is released into the atmosphere safely without flowing into the passenger's room section or the engine room section from which an inflammable gas should be kept out.

In a case where the fuel cutoff valve is provided between the fuel gas bomb and the upstream regulator, the supply of fuel gas is cut off at a position close to the bomb when the engine is stopped. This minimizes the conduit portion which is constantly subjected to a high pressure, enhancing the reliability and safety further more.

Since the cooling effect of the adiabatic expansion of the decompressed fuel gas on the circumventive parts is precluded by a PTC heater in an embodiment of the regulator according to the invention, it is possible to heat up these parts more promptly immediately after starting an engine and to maintain them at a desired temperature more stably thereafter as compared with the technology of heating the regulator by the use of cooling water heated by the engine. This heat is also transferred to the fuel cutoff valve to prevent freezing thereof.

In case of the regulator employing a heat pipe, an arbitrary portion of the exhaust system can be used as a heat source, so that the temperature of the heated zone can be set at a desired level without providing a special energy source for heating. The intermediate portion between the opposite ends of the heat pipe normally has a heat insulating structure, which has no heating effect on adjacent parts even if located along a steel sheet of the vehicle body or along the fuel gas bomb, and therefore imposes no thermal affect on the gas fuel supply system.

What is claimed is:

1. A regulator for a gaseous fuel operated vehicle engine, comprising:
   a high pressure housing defining therein a high pressure gas passage and a valve chamber, said passage having one end thereof connectible to a high pressure conduit for introducing high pressure gaseous fuel thereinto and the other end thereof opening to said valve chamber;
   a low pressure housing fixedly mounted to said high pressure housing, said low pressure housing defining therein a decompression chamber;

valve means mounted in said valve chamber for selectively opening and closing said other end of said high pressure gas passage in response to the gas pressure in said decompression chamber;

means for moving said valve means in response to the gas pressure in said decompression chamber, said moving means including a diaphragm disposed parallel with the flow of gaseous fuel through said decompression chamber;

fuel cutoff valve means mounted in said high pressure gas passage for cutting off the supply of high pressure fuel gas when the engine is at rest or at a time of emergency; and PTC heater means located around said valve means and adjacent to said fuel cutoff valve means for heating both, said PTC heater means having an electric resistance with a positive temperature coefficient.

* * * * *